United States Patent [19]
Messinger

[11] Patent Number: 5,411,230
[45] Date of Patent: May 2, 1995

[54] SUCTION-TYPE CLAMP

[76] Inventor: Jules Messinger, Frohburgstrasse 297, CH-8057 Zurich, Switzerland

[21] Appl. No.: 150,041

[22] PCT Filed: Mar. 15, 1993

[86] PCT No.: PCT/CH93/00069

§ 371 Date: Nov. 16, 1993

§ 102(e) Date: Nov. 16, 1993

[87] PCT Pub. No.: WO93/19304

PCT Pub. Date: Sep. 30, 1993

[30] Foreign Application Priority Data

Mar. 16, 1992 [CH] Switzerland ............... 835/92

[51] Int. Cl.⁶ .................................. A45D 42/14
[52] U.S. Cl. ............................. 248/205.8; 248/206.2
[58] Field of Search ........... 248/206.5, 205.8, 205.5, 248/205.6, 206.2, 206.3, 362, 363; 294/64.1

[56] References Cited

U.S. PATENT DOCUMENTS

| | | | |
|---|---|---|---|
| 371,281 | 10/1887 | Siemang | 294/64.1 X |
| 1,010,363 | 11/1911 | Hazelrigg | 294/64.1 X |
| 1,739,641 | 12/1929 | Lessmann | 248/206.2 X |
| 2,047,658 | 7/1936 | Zaiger | 248/205.8 |
| 2,146,859 | 2/1939 | Seklehner | 248/205.5 X |
| 2,311,525 | 2/1943 | Ebbs | 294/64.1 X |
| 3,747,170 | 7/1973 | Kieves | 248/205.8 X |

FOREIGN PATENT DOCUMENTS

| | | | |
|---|---|---|---|
| 945385 | 5/1949 | France . | |
| 1517615 | 2/1968 | France | 248/205.5 |
| 2351302 | 12/1977 | France . | |
| 2044859 | 4/1971 | Germany . | |
| 315425 | 9/1930 | United Kingdom | 248/205.5 |
| 975271 | 11/1964 | United Kingdom | 248/205.8 |
| 2185067 | 7/1987 | United Kingdom . | |

*Primary Examiner*—J. Franklin Foss
*Attorney, Agent, or Firm*—Speckman, Pauly & Fejer

[57] ABSTRACT

A holding device having a flexible diaphragm, a central pin embedded in the flexible diaphragm, a pressure ring in contact with a periphery of the diaphragm and a mechanism for lifting the central pin with respect to the pressure ring. The diaphragm has a plurality of cams circumferentially disposed about the diaphragm. An inside surface of a wall of the pressure ring has recesses which mate with the cams and connect the diaphragm with the pressure ring thereby securing the diaphragm against relative rotation with respect to the pressure ring and allowing the diaphragm to move axially with respect to the pressure ring.

5 Claims, 3 Drawing Sheets

SUCTION-TYPE CLAMP

BACKGROUND OF THE INVENTION

1. Field of the Invention

This invention relates to a holding device having a flexible diaphragm acting as a suction cup, with assembled central pin. The holding device has a pressure ring which contacts the periphery of the diaphragm, and a mechanism for lifting the central pin with respect to the pressure ring.

2. Description of the Prior Art

A conventional holding device is known, for example, from British Patent GB-PS 2,185,067. The British Patent teaches a pressure ring with a top cover. A pin extends through the cover and is pulled upward by an actuating member. A helically shaped ramp pulls the pin upward. To accomplish this, it is necessary to turn the actuating member, thus there is always a danger that the pressure ring will turn along with the actuating member and slide over the diaphragm.

SUMMARY OF THE INVENTION

It is one object of this invention to provide a holding device which is constructed as simply as possible and prevents this danger.

BRIEF DESCRIPTION OF THE DRAWINGS

One preferred embodiment of this invention is illustrated in the accompanying drawings wherein.

DESCRIPTION OF PREFERRED EMBODIMENTS

A holding device of this essentially comprises three parts, a diaphragm 1, a pressure ring 2 and a cover 3. The holding device is shown in an operational position in FIG. 1, in which the holding device is firmly attached to a smooth surface, for example a sheet of glass or a mirror. The individual parts will be first described in detail and their interaction will be explained.

Figure 3:
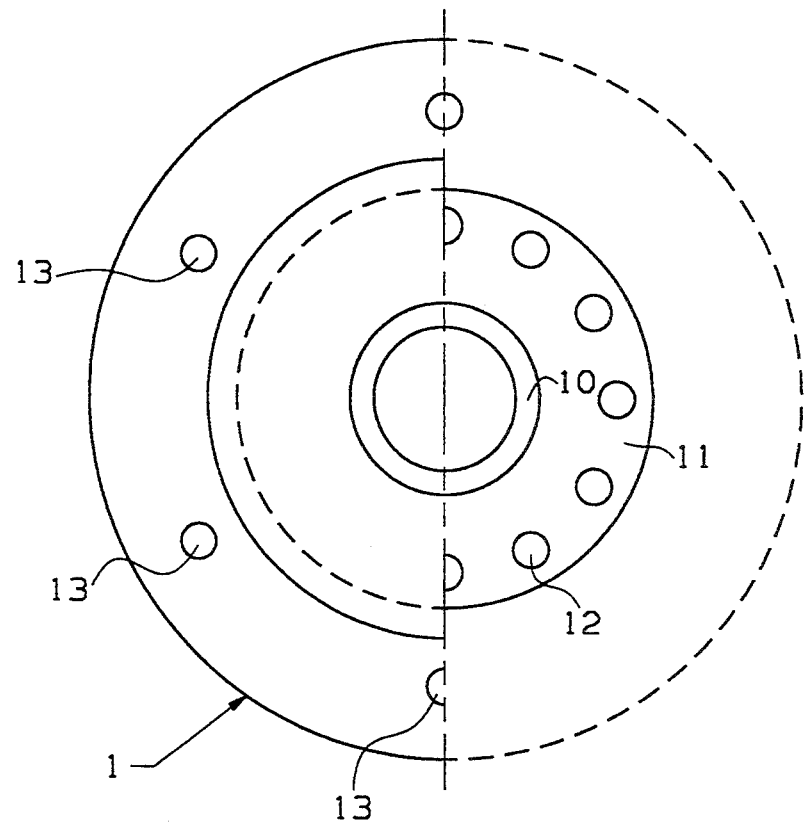
FIG. 3 is a top view of a diaphragm of the device shown in FIG. 1.
Figure 4:
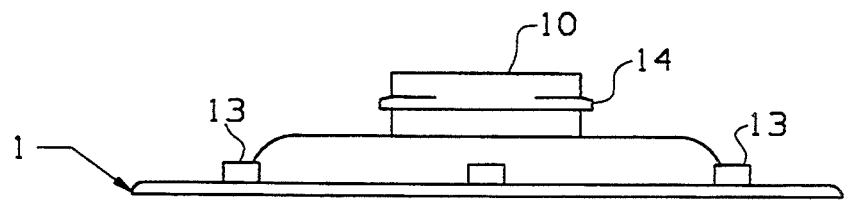
FIG. 4 is a side view of the diaphragm shown in FIG. 3.

The circular diaphragm 1 comprises rubber or a rubberelastic plastic material. A pin is, preferably of a hard plastic material, is attached to the center, a flange 11 of which is embedded in the diaphragm 1. The flange 11 has a plurality of holes 12 for improved adhesion to the diaphragm 1. The left half of FIG. 3 shows the top of the diaphragm 1 and the pin 10, and the right half of FIG. 3 shows the flange 11. Cams 13, projecting out of the upper surface of the diaphragm 1, are shown in FIG. 3 and in FIG. 4. Six circularly arranged cams 13 are shown in the preferred embodiment of FIGS. 3 and 4. To conserve material and for manufacturing reasons the pin 10 is hollow. The pin 10 has a shoulder 14 in its upper area, the purpose of which will be explained later.

Figure 2:
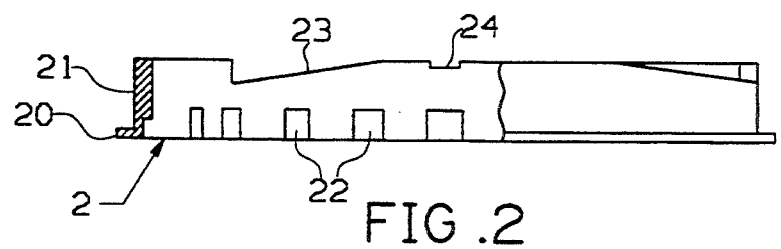
FIG. 2 is a partial sectional view of a pressure ring of the device shown in FIG. 1.

The pressure ring 2 shown in FIG. 2 is prefereably made of a hard plastic material. The pressure ring 2 has a projecting rim 20 at the bottom. The inside surface of the wall 21 of the pressure ring 2 has evenly spaced recesses 22, which have the shape of semi-circular niches the curvature of which approximately corresponds to the diameter of the cams 13. Twenty-four recesses 22 are evenly distributed along the circumference. Three ramps 23 are evenly distributed on an upper rim of the wall which terminates in the wall 21. In an upper end of the ramp 23 a small indentation 24 is used as a stop.

Figure 1:
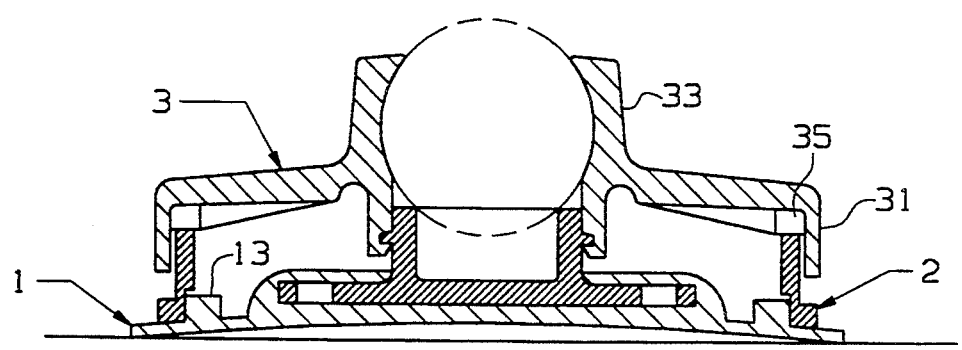
FIG. 1 is a sectional view of a holding device, according to one preferred embodiment of this invention.
Figure 5:
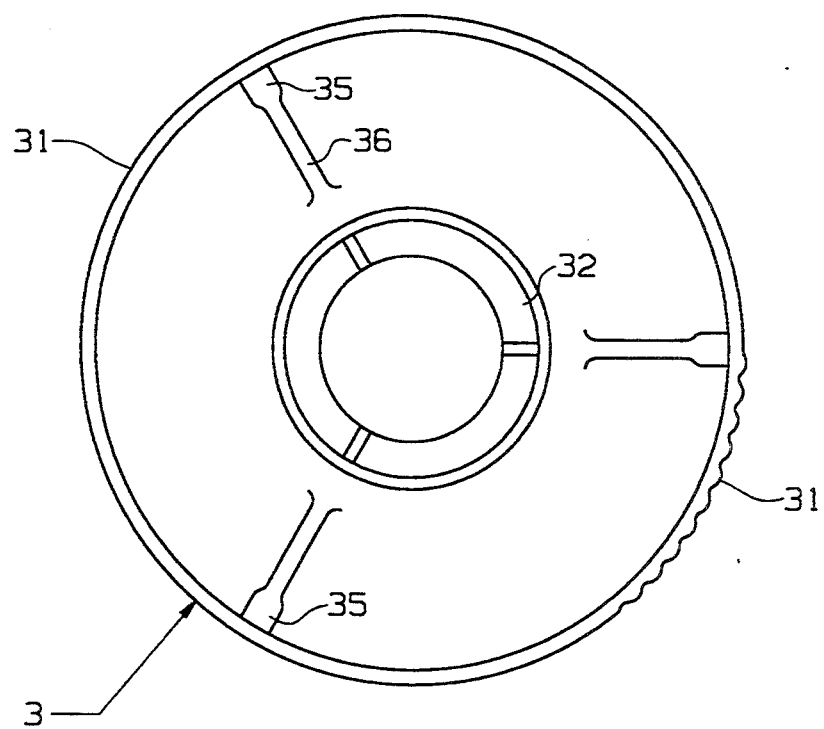
FIG. 5 is a bottom view of a cover of the device shown in FIG. 1.
Figure 6:
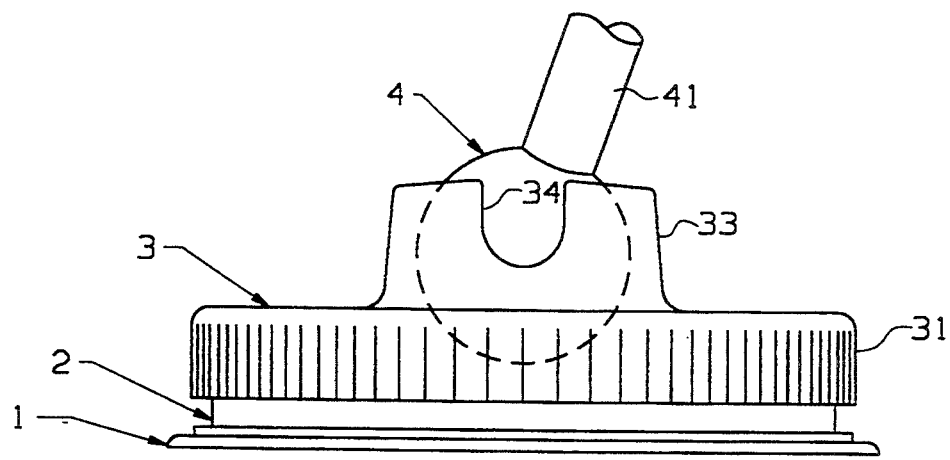
FIG. 6 is a side view of the holding device shown in FIG. 1.
Figure 7:
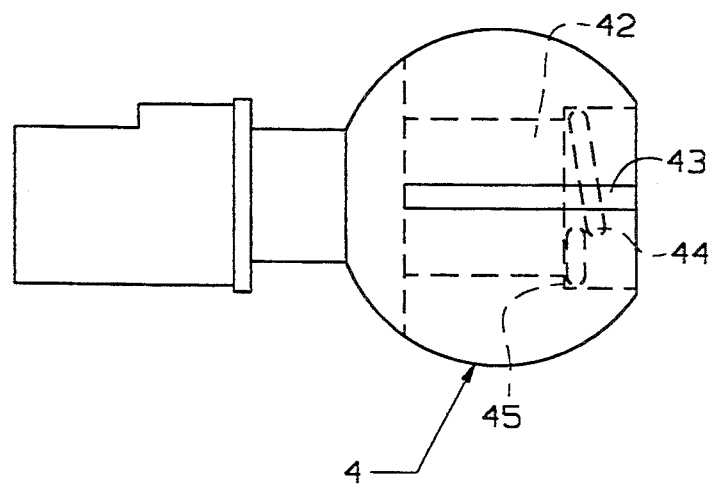
FIG. 7 is a sectional view of the holding device according to one preferred embodiment of this invention.

A cover 3 as shown in FIGS. 1 and 5 has a rim 31 which extends beyond the pressure ring 2 with play in the assembled state. A slitted sleeve 32, having a circumferential groove on an inside surface sized to engage with the shoulder 14 of the pin 10, is located in the center of the cover 3. A collar 33 is disposed on the top of the cover 3 and has a spherically shaped inside surface, into which a ball 4 of a holding member 41 can be mated. The collar 33 has a slit 34 which allows the holding member 41 to pivot completely downward. The ball 4 is securely held in the collar 33 in every position.

Three cams 35 are disposed on the underside of the cover 3 near the rim 31 and transition into the ramps 36 which slope toward the center of the cover 3, as shown in FIG. 5.

During assembly, the pressure ring 2 is placed on the diaphragm 1 so that cams 13 engage the recesses 22. Thus the pressure ring 2 is connected with the diaphragm 1 in a manner fixed against relative rotation and, at the same time, the pressure ring 2 is centered on the diaphragm 1. The cover 3 can then be pressed on the pin 10, while the slitted sleeve 32 slides over the pin 10 and the shoulder 14 snaps into the groove in the sleeve 32. After the holding device has been assembled it can no longer be assembled without destroying it.

In the rest position, the cams 35 rest on the ramps 23 in their lowest position.

If the holding device is now pressed against a smooth surface and the cover 3 is rotated, the cams 35 slide along the ramps 23, and the cover 3 moves upward with respect to the pressure ring 2 and takes along the pin 10 of the diaphragm 1. This causes a desired suction effect.

Because holding devices are often employed in the bathroom to hold cosmetic mirrors, it is desirable to galvanize them. The galvanic coating of the cover 3 causes the collar 33 to have almost no elasticity. Because of this, the ball joint, formed by the collar 33 acting as the socket and the spherical end (4) of the holding device, acting as the ball head are barely self-locking. To increase pressure and friction between the collar 33 and the spherical end 4 of the holding device, acting as the ball head 4 preferrably has a centered blind bore 42 and slits 43, disposed crosswise in the direction of the blind axis of the bore 42. The contact pressure can be adjusted by inserting a radially movable spring washer 44 the blind bore 42. To retain the spring washer 44 in the correct position, the blind bore 42 has a stepped reduction in diameters 45 forming a stop for the spring washer 44.

I claim:

1. In a holding device having a flexible diaphragm (1), a central pin (10) embedded in the diaphragm (1), a pressure ring (2) positioned on a circumferential area of the diaphragm (1), and means for lifting the central pin

(10) with respect to the pressure ring (2), the improvement comprising: the diaphragm (1) having a plurality of cams (13) circumferentially arranged about the diaphragm (1), an inside surface of a wall (21) of the pressure ring (2) having a plurality of recesses (22) which engage the cams (31) and connect the diaphragm (1) with the pressure ring (2) and secure the diaphragm (1) against relative rotation with respect to the pressure ring (2), and the diaphragm (1) being axially moveable with respect to the pressure ring (2), the means for lifting the central pin (10) comprising a cover (3), the cover (3) being connected to the central pin (10) in a rotatable but axially fixed manner, projections (35) disposed on a surface of an underside of the cover (3), and a plurality of ramps (23) disposed on a rim of the pressure ring (2) cooperating with the projections (35).

2. In a holding device in accordance with claim 1, wherein an underside of the cover (3) has an axially slit sleeve (32) with an inwardly oriented rim, the central pin (10) has a shoulder (14), and the slit sleeve (32) is engageable with the central pin (10) in a snap manner.

3. In a holding device in accordance with claim 1, wherein the cover (3) has a rim (31) which overlaps the pressure ring (2).

4. In a holding device in accordance with claim 1, wherein the top of the cover (3) has a collar (33), an inner surface of the collar (33) is spherically shaped for engageably receiving a spherical end (4) of a holding member.

5. In a holding device in accordance with claim 4, wherein the spherical end (4) has a central blind bore (42) with a stepped reduction in diameters (45), the spherical end (4) has slits (43) disposed crosswise in a direction of the blind bore (42), and a radially acting spring washer (44) is positioned within the blind bore (42).

* * * * *